(12) United States Patent
Aridome et al.

(10) Patent No.: US 8,219,248 B2
(45) Date of Patent: Jul. 10, 2012

(54) CONTROL DEVICE AND CONTROL METHOD FOR COOLING FAN

(75) Inventors: Koji Aridome, Toyota (JP); Yusuke Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 882 days.

(21) Appl. No.: 12/087,785

(22) PCT Filed: Dec. 21, 2006

(86) PCT No.: PCT/JP2006/326182
§ 371 (c)(1),
(2), (4) Date: Jul. 15, 2008

(87) PCT Pub. No.: WO2007/086231
PCT Pub. Date: Aug. 2, 2007

(65) Prior Publication Data
US 2009/0024252 A1    Jan. 22, 2009

(30) Foreign Application Priority Data

Jan. 27, 2006  (JP) ................................. 2006-019630

(51) Int. Cl.
*G05B 15/00*  (2006.01)
*F24H 3/02*  (2006.01)

(52) U.S. Cl. ......... 700/275; 429/62; 62/236; 123/41.49; 123/41.02; 318/473; 318/519; 180/65.29; 320/134; 320/150; 320/128; 320/104; 165/121; 307/10.1; 324/430; 701/22

(58) Field of Classification Search .................. 700/275; 29/62; 165/21

See application file for complete search history.

(56) References Cited

U.S. PATENT DOCUMENTS

| | | | | |
|---|---|---|---|---|
| 6,625,528 | B2 * | 9/2003 | Kobayashi | 701/36 |
| 7,102,310 | B2 * | 9/2006 | Ishishita | 318/268 |
| 7,441,616 | B2 * | 10/2008 | Sugita et al. | 180/65.285 |
| 7,479,753 | B1 * | 1/2009 | Mimberg | 318/599 |
| 7,647,788 | B2 * | 1/2010 | Okuda et al. | 62/259.2 |
| 7,902,806 | B2 * | 3/2011 | Yabe et al. | 323/288 |
| 2003/0107341 | A1 * | 6/2003 | Morris | 318/599 |
| 2003/0118891 | A1 * | 6/2003 | Saito et al. | 429/62 |
| 2005/0257546 | A1 * | 11/2005 | Ishishita | 62/236 |
| 2006/0055242 | A1 * | 3/2006 | Lee | 307/10.1 |
| 2010/0155162 | A1 * | 6/2010 | Nakamura et al. | 180/65.29 |

FOREIGN PATENT DOCUMENTS

| | | | |
|---|---|---|---|
| JP | 61147708 | * | 7/1986 |
| JP | 64-38521 | * | 2/1989 |
| JP | A-01-135603 | | 5/1989 |
| JP | 5-185829 | * | 7/1993 |
| JP | A-08-148190 | | 6/1996 |

(Continued)

*Primary Examiner* — Albert Decady
*Assistant Examiner* — Olvin Lopez Alvarez
(74) *Attorney, Agent, or Firm* — Oliff & Berridge, PLC

(57) ABSTRACT

A hybrid ECU executes a program including the steps of: setting a fan driving level F for a cooling fan, as based on a high voltage battery's temperature TB, SOC and input and output currents, and a vehicular cabin's internal temperature and background noise; detecting from a signal transmitted from a voltage sensor the voltage of an auxiliary battery serving as a power supply for the cooling fan; and setting a duty command value for the cooling fan from fan driving level F and the auxiliary battery's voltage so that the duty command value is smaller as a voltage of the auxiliary battery is higher.

18 Claims, 12 Drawing Sheets

FOREIGN PATENT DOCUMENTS

| | | |
|---|---|---|
| JP | A-11-238530 | 8/1999 |
| JP | A-2001-210389 | 8/2001 |
| JP | A-2002-051479 | 2/2002 |
| JP | A-2002-151166 | 5/2002 |
| JP | A-2003-111291 | 4/2003 |
| JP | A-02-168865 | 9/2003 |
| JP | A-2003-274572 | 9/2003 |
| JP | A-2004-080914 | 3/2004 |
| JP | 20050-63689 * | 3/2005 |
| JP | A-2005-184979 | 7/2005 |

* cited by examiner

|  |  | FAN DRIVING LEVEL F | | | | | | | |
|---|---|---|---|---|---|---|---|---|---|
|  |  | 1 | 2 | 3 | 4 | 5 | 6 | 7 | 8 |
| VOLTAGE OF AUXILIARY | 10V | 0 | 20% | 40% | 60% | 80% | 100% | 100% | 100% |
|  | 14V | 0 | 15% | 30% | 45% | 60% | 75% | 90% | 100% |

FIG. 5

|  | VOTAGE OF AUXILIARY | | |
|---|---|---|---|
|  | 10V | 12V | 14V |
| LOWER LIMIT VALUE | 20% | 15% | 10% |

F I G. 1 0
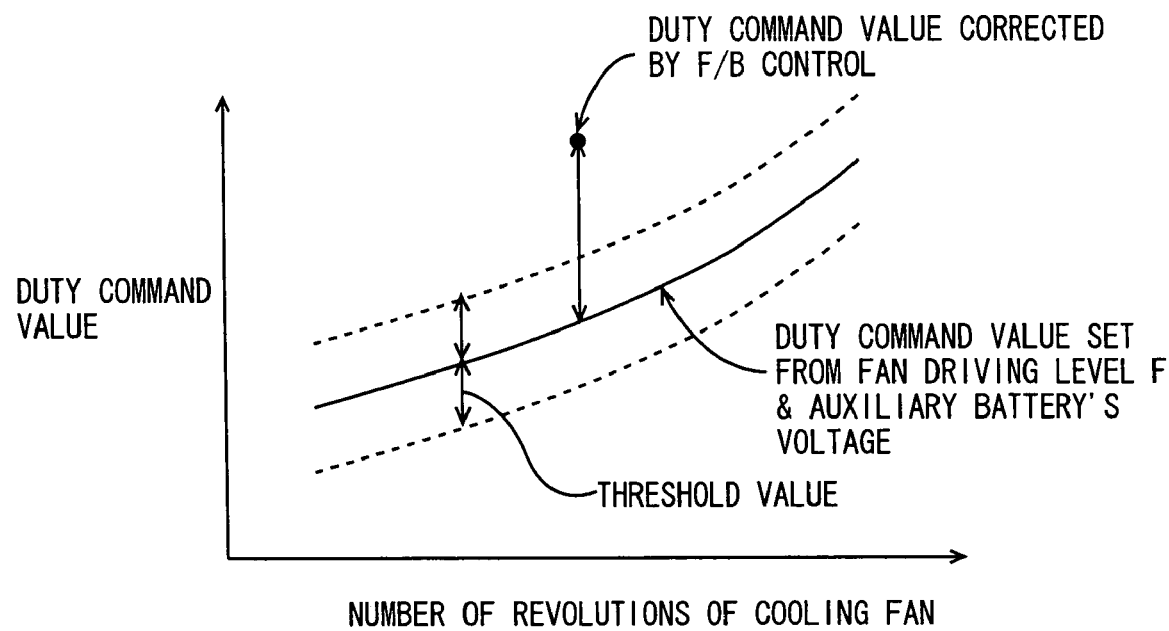

CONTROL DEVICE AND CONTROL METHOD FOR COOLING FAN

TECHNICAL FIELD

The present invention relates to control devices and control methods for cooling fans and particularly to technology applied to control cooling fans receiving electric power from a first power storage mechanism to be driven to blow cooling air to cool a second power storage mechanism.

BACKGROUND ART

In recent years, as an approach for environmentalism, hybrid vehicles, electric vehicles, fuel cell vehicles and the like that can employ driving force obtained from a motor to travel are gaining attention. These vehicles have a secondary a battery, a capacitor or a similar power storage mechanism mounted therein to store electric power supplied to the motor. The battery, capacitor and the like generate heat as they are charged/discharged. Accordingly they need to be cooled.

Japanese Patent Laying-open No. 2005-184979 discloses a power supply device for a vehicle that can cool a battery efficiently to effectively liberate the battery from troubles associated with temperature, while reducing noise audible to a passenger in a cabin of the vehicle. As described in Japanese Patent Laying-open No. 2005-184979, the power supply device comprises a battery unit including a plurality of batteries, an air blowing fan blowing air to the battery unit to cool the batteries, a switching element controlling electric power supplied to the air blowing fan, and a control circuit that changes a fan duty repeatedly turning the switching element on and off periodically, as predetermined, to supply the air blowing fan with electric power as controlled by a width of a pulse of PWM (pulse width modulation). The control circuit detects the temperature of the batteries of the battery unit by a temperature sensor and in addition thereto detects a vehicular speed signal output from the vehicle having the power supply device mounted therein to detect the vehicle's speed. The control circuit uses both the batteries' temperature and the vehicle's speed as variables to modify a duty at which the switching element is turned on/off. If the battery unit's batteries rise in temperature or the vehicle is increased in speed, the switching element is turned on/off with an increased duty to allow the air blowing fan to receive more electric power.

The power supply device described in the publication modifies a duty, at which a switching element supplying an air blowing fan with electric power is turned on/off, in accordance with vehicular speed and engine speed. Thus when vehicular speed and engine speed are raised and larger noise is accordingly caused, the air blowing fan can rotate fast by increasing a duty at which the switching element supplying an air blowing fan with electric power is turned on/off. Thus the driver never hears as a noise the sound caused by the air blowing fan as it is operated. Thus a noise audible to the passenger(s) of the vehicle can be reduced while the batteries can be efficiently cooled and thus effectively liberated from troubles associated with temperature.

However, the cooling fan does not necessarily rotate at a constant number of revolutions with a constant duty (duty ratio). However, Japanese Patent Laying-open No. 2005-184979 neither discloses nor suggests such issue. A number of revolutions of the cooling fan thus is not controlled precisely.

DISCLOSURE OF THE INVENTION

The present invention contemplates a control device and the like for a cooling fan that can control the number of revolutions of the cooling fan with precision.

The present invention provides a control device for a cooling fan that controls a cooling fan receiving electric power from a first power storage mechanism to be driven to blow cooling air to cool a second power storage mechanism. The control device includes: a voltage sensor detecting the voltage of the first power storage mechanism; and an operation unit connected to the voltage sensor. The operation unit controls the number of revolutions of the cooling fan and sets a control value in accordance with the voltage of the first power storage mechanism for varying the number of revolutions of the cooling fan.

In accordance with the present invention the number of revolutions of a cooling fan receiving electric power from a first power storage mechanism to be driven to blow cooling air to cool a second power storage mechanism is controlled. The number of revolutions of the cooling fan is controlled by setting a control value. Other than the control value, the voltage (output voltage) of the first power storage mechanism, which serves as a power supply for the cooling fan, also affects the number of revolutions of the cooling fan to vary. For example, when a voltage of the first power storage mechanism is high, the cooling fan has a larger number of revolutions than when a voltage of the first power storage mechanism is low. Accordingly the first power storage mechanism's voltage (output voltage) is detected and in accordance therewith the control value is set. This can prevent the cooling fan from having a number of revolutions varying with the first power storage mechanism's voltage. Thus there can be provided a control device for a cooling fan, that can control the number of revolutions of the cooling fan with precision.

Preferably a voltage of the first power storage mechanism is lower than a voltage of the second power storage mechanism.

In accordance with the present invention, a number of revolutions can be controlled with precision for the cooling fan that is driven with the first power storage mechanism, whose voltage is lower than a voltage of the second power storage mechanism, serving as a power supply for the cooling fan.

More preferably, in addition to setting the control value in accordance with the voltage of the first power storage mechanism, the operation unit sets the control value such that a number of revolutions of said cooling fan is larger as state of charge of the second power storage mechanism is larger.

A quantity of heat generated in the second power storage mechanism is larger as a state of charge of the second power storage mechanism is larger, and accordingly, in accordance with the present invention, a number of revolutions of the cooling fan is increased. This can reduce the second power storage mechanism's temperature elevation.

More preferably, in addition to setting the control value in accordance with the voltage of the first power storage mechanism, the operation unit sets the control value such that a number of revolutions of said cooling fan is larger as a input/output current of the second power storage mechanism is larger.

A quantity of heat generated in the second power storage mechanism is larger as a input/output current of the second power storage mechanism is larger, and accordingly, in accordance with the present invention, a number of revolutions of the cooling fan is increased. This can reduce the second power storage mechanism's temperature elevation.

More preferably, in addition to setting the control value in accordance with the voltage of the first power storage mechanism, the operation unit sets the control value such that a number of revolutions of said cooling fan is larger as a difference between a temperature of the second power storage mechanism and a temperature of the cooling air blown by the cooling fan is smaller.

The smaller the difference in temperature between the second power storage mechanism and the cooling air blown by the cooling fan is, the less efficiently the cooling air cools the second power storage mechanism. Accordingly, in accordance with the present invention, a number of revolutions of the cooling fan is increased. This can reduce the second power storage mechanism's temperature elevation.

More preferably the operation unit further sets a limit value for the control value in accordance with the voltage of the first power storage mechanism.

In accordance with the present invention a limit value is set for the control value to prevent a number of revolutions of the cooling fan from varying significantly. More specifically, a number of revolutions of the cooling fan varies as it is affected by the voltage of the first power storage mechanism, which serves as a power supply for the cooling fan. Accordingly, a limit value is set for the control value, as based on the first power storage mechanism's voltage. Thus, a number of revolutions of the cooling fan can limited precisely.

More preferably, furthermore the operation unit corrects the control value by feedback control, as based on operational state of the cooling fan, to operate the cooling fan in a predetermined operational state, and if a difference between the control value corrected by the feedback control and the control value set in accordance with the voltage of the first power storage mechanism is larger than a predetermined value, the operation unit determines that the cooling fan has a malfunction.

In accordance with the present invention the control value is corrected by feedback control, as based on operational state of the cooling fan currently operates, to operate the cooling fan in a predetermined operational state. Thus, a number of revolutions of the cooling fan can be controlled with precision to be a number of revolutions as desired. If a difference between the control value corrected by the feedback control and a set control value is larger than a predetermined value, it can be said that the cooling fan has a malfunction. Thus a decision is made that the cooling fan is abnormally operating. The cooling fan's state can thus be grasped.

More preferably, furthermore the operation unit corrects the control value by feedback control, as based on operational state of the cooling fan, to operate the cooling fan in a predetermined operational state; if a predetermined condition with respect to the first power storage mechanism is satisfied, the operation unit prohibits correcting the control value by the feedback control; and if the predetermined condition is satisfied, the operation unit sets a control value different from the control value set in accordance with the voltage of the first power storage mechanism.

In accordance with the present invention the control value is corrected by feedback control, as based on operational state of the cooling fan, to operate the cooling fan in a predetermined state. Thus, a number of revolutions of the cooling fan can be controlled with precision to be a number of revolutions as desired. Note that a number of revolutions of the cooling fan varies as it is affected by the voltage of the first power storage mechanism, which serves as a power supply. Thus if a voltage of the first power storage mechanism rapidly varies, a number of revolutions of the cooling fan may varies. In that case, a operational state (e.g., a number of revolutions) of the cooling fan is different from that suitable for the voltage attained after the variation. Accordingly, feedback control is applied to correct the control value, resulting in a number of revolutions of the cooling fan again rapidly varies. To prevent a number of revolutions of the cooling fan from repeating a rapid varying, correcting the control value by feedback control is prohibited if a predetermined condition with respect to the first power storage mechanism is satisfied. Furthermore, a control value is set that is different from that set in accordance with the first power storage mechanism's voltage. For example, if a condition allowing an expectation that a voltage of the first power storage mechanism will rapidly vary is satisfied, correcting a control value by feedback control is prohibited and a control value that corresponds to the voltage attained after the variation is also set. Thus the control value that corresponds to the voltage attained after the variation can be maintained before a voltage of the first power storage mechanism rapidly varies. Thus, rapid varying of a operational state (a number of revolutions) of the cooling fan caused by rapid varying of a voltage of the first power storage mechanism can be prevented.

More preferably, the predetermined condition is a condition that it is before charging the first power storage mechanism starts.

When charging the first power storage mechanism starts, a voltage of the first power storage mechanism may rapidly vary. Accordingly, in accordance with the present invention, before charging the first power storage mechanism starts, for example a control value corrected to correspond to a voltage assumed after charging the first power storage mechanism has started is provided, and correcting the control value by feedback control is also prohibited. Thus before a voltage of the first power storage mechanism rapidly varies, the cooling fan can operate with a control value corresponding to a voltage attained after variation. Thus, rapid varying of a operational state (a number of revolutions) of the cooling fan caused by rapid varying of a voltage of the first power storage mechanism can be prevented.

More preferably, if a difference between the control value corrected by the feedback control and the control value set in accordance with the voltage of the first power storage mechanism is larger than a predetermined value, the operation unit determines that the cooling fan has a malfunction.

In accordance with the present invention, if a difference between the control value corrected by the feedback control and the control value set in accordance with the voltage of the first power storage mechanism is larger than a predetermined value, it can be said that the cooling fan is not operating as controlled, and accordingly, a decision is made that the cooling fan has a malfunction. The cooling fan's state can thus be grasped.

BRIEF DESCRIPTION OF THE DRAWINGS

FIG. 5 shows a map used for setting a lower limit value for the duty command value.

FIG. 10 shows a duty command value corrected through feedback control when a cooling fan has a malfunction.

BEST MODES FOR CARRYING OUT THE INVENTION

Figure 1:
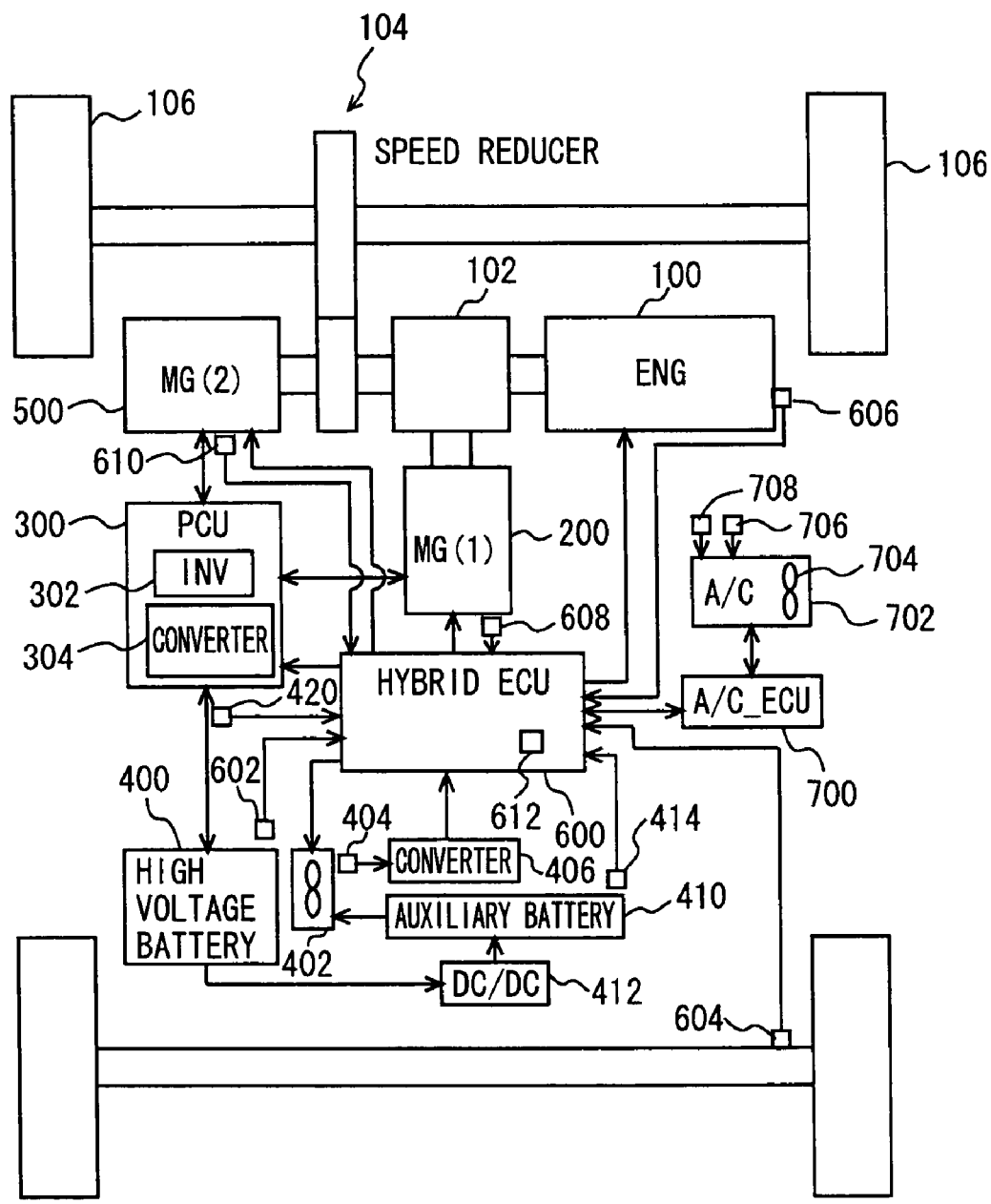
FIG. 1 is a control block diagram showing a vehicle having mounted therein a control device for a cooling fan in a first embodiment of the present invention.

Hereinafter reference will be made to the drawings to describe the present invention in embodiments. In the following description, identical components are denoted by identical reference characters. Their names and functions are also identical. Accordingly, they will not be described repeatedly in detail.

First Embodiment

Reference will be made to FIG. 1 to describe a vehicle having mounted therein a control device for a cooling fan in a first embodiment of the present invention. This vehicle includes engine 100, MG (motor generator) (1) 200, PCU (Power Control Unit) 300, high voltage battery 400, cooling fan 402, auxiliary battery 410, DC/DC converter 412, MG (2) 500, hybrid ECU (Electronic Control Unit) 600, A/C (Air Conditioner)_ECU 700, and A/C unit 702. The present control device for the cooling fan is implemented for example by a program executed by hybrid ECU 600.

Note that while the present embodiment will be described in conjunction with a hybrid vehicle having engine 100 mounted therein, the hybrid vehicle may be replaced with a fuel cell vehicle having a fuel cell mounted therein, an electric vehicle, or the like.

Engine 100 combusts an air fuel mixture to rotate a crankshaft (not shown) to generate a driving force which is in turn divided by power split device 102 to two paths: one drives wheel 106 via speed reducer 104 and the other drives MG (1) 200 to generate electric power.

MG (1) 200 is driven by the driving force of engine 100 that has been divided by power split device 102, and thus generates electric power, which is used in accordance with: operational state of the vehicle; high voltage battery 400's SOC (State Of Charge); and the like. For example, when the vehicle normally travels, is rapidly accelerated, or the like, the electric power generated by MG (1) 200 is supplied via PCU 300 to MG (2) 500.

If high voltage battery 400 has a SOC lower than a predetermined value, then the electric power generated by MG (1) 200 is converted by inverter 302 of PCU 300 from alternate current electric power to direct current electric power which is in turn adjusted by converter 304 in voltage and subsequently stored in high voltage battery 400.

The SOC of high voltage battery 400 is estimated by hybrid ECU 600 from input and output currents detected by current sensor 420. This can be done with general, known techniques, and will not be described specifically.

High voltage battery 400 is a set of batteries configured of a plurality of series connected battery modules each formed of a plurality of battery cells integrated together. High voltage battery 400 may be replaced with a capacitor. High voltage battery 400 exchanges heat with cooling air supplied by cooling fan 402, and is thus cooled. Cooling fan 402 supplies the cabin's internal air to high voltage battery 400.

Cooling fan 402 receives electric power from auxiliary battery 410 having a rated voltage lower than high voltage battery 400. High voltage battery 400 has a rated voltage for example of approximately 300 V, and auxiliary battery 410 has a rated voltage for example of 14 V (when it provides an output.) Cooling fan 402 is controlled by hybrid ECU 600 by duty control. More specifically, cooling fan 402 is controlled by a duty command value (a command value of a duty ratio for cooling fan 402) transmitted from hybrid ECU 600 to cooling fan 402.

Duty control, as referred to herein, refers to controlling a ratio (a duty ratio) at which a switching element provided between auxiliary battery 410 and cooling fan 402 turns on to control a voltage on which cooling fan 402 operates. Cooling fan 402 thus operates on a voltage corresponding to the duty command value.

Auxiliary battery 410 receives electric power via DC/DC converter 412 from high voltage battery 400. More specifically, high voltage battery 400 outputs a voltage, which is downconverted by DC/DC converter 412 and thus charges auxiliary battery 410. Auxiliary battery 410 has a voltage, which is detected by voltage sensor 414 transmitting to hybrid ECU 600 a signal representing a resultant detection.

Auxiliary battery 410 is for example a lead-acid storage battery. Alternatively, it may be a nickel metal hydride battery, a lithium battery or the like, or may be a capacitor or the like.

MG (2) 500 is a three phase, alternate current rotating machine. MG (2) 500 is driven on at least one of the electric power stored in high voltage battery 400 and that generated by MG (1) 200. MG (2) 500 provides a driving force, which is transmitted via speed reducer 104 to wheel 106. MG (2) 500 thus assists engine 100 or alone provides a driving force to allow the vehicle to travel and the like.

When the vehicle is regeneratively braked, MG (2) 500 is driven by wheel 106 via speed reducer 104 and thus operated as a power generator. MG (2) 500 thus acts as a regenerative brake converting braking energy to electric power. MG (2) 500 thus generates electric power, which is stored via inverter 302 and converter 304 to high voltage battery 400.

Hybrid ECU 600 is connected to battery temperature sensor 602, vehicular speed sensor 604, crank position sensor 606, revolution sensor (1) 608 and revolution sensor (2) 610.

Battery temperature sensor 602 detects temperature TB of high voltage battery 400. Vehicular speed sensor 604 detects the number of revolutions of the wheel. Crank position sensor 606 is provided opposite a timing rotor provided for the crankshaft, to detect the number of revolutions of the crankshaft. Revolution sensor (1) 608 detects the number of revolutions of MG (1) 200. Revolution sensor (2) 610 detects the number of revolutions of MG (2) 500.

Battery temperature sensor 602, vehicular speed sensor 604, crank position sensor 606, revolution sensor (1) 608 and revolution sensor (2) 610 provide detections, which are represented by signals and thus transmitted to hybrid ECU 600.

Hybrid ECU 600 performs an operation process based for example on: the signals received from the sensors; operational state of the vehicle; an accelerator pedal position; a rate of change of the accelerator pedal position; a shift position; the SOC and temperature of high voltage battery 400; a map, a program, and the like stored in memory 612; and the like.

Hybrid ECU 600 thus controls equipment mounted in the vehicle so that the vehicle can be driven in a state as desired.

A/C_ECU 700 is connected to A/C unit 702. A/C_ECU 700 controls A/C unit 702 in accordance with the temperature in the cabin as detected by cabin temperature sensor 706 and operational state of switch 708 which is operated by a passenger. A/C unit 702 blows out air having a temperature for blowing, as set by A/C_ECU 700.

A/C_ECU 700 determines in levels a voltage that drives A/C fan 704, as based on the cabin's internal temperature. The voltage that drives A/C fan 704 is determined by determining an A/C fan driving level. The determined A/C fan driving level is transmitted to hybrid ECU 600.

From the signals received from vehicular speed sensor 604, crank position sensor 606, revolution sensor (1) 608 and revolution sensor (2) 610, the A/C fan driving level, the noises caused by auxiliaries, the volume of the sound of audio equipment (not shown), and the like, hybrid ECU 600 detects background noise in the cabin excluding the sound caused by cooling fan 402 as it operates. The background noise can be detected with reference to a map determined previously for example through an experiment.

Hybrid ECU 600 sets level F indicating a quantity of air of cooling fan 402 for driving cooling fan 402 based on high voltage battery 400's temperature TB, SOC and input and output currents, and the cabin's internal temperature and background noise.

Fan driving level F is set higher as a temperature TB of high voltage battery 400 is higher. Furthermore, it is set higher as a background noise is larger. Furthermore, it is set higher as a SOC of high voltage battery 400 is larger. It is set higher as a input and output currents of high voltage battery 400 is larger. Furthermore, it is set higher as a differences between the temperature internal to the cabin (i.e., the temperature of air blown by cooling fan 402 for cooling) and that of high voltage battery 400 is smaller. A duty command value is set larger as fan driving level F is higher.

Figures 2, 3:
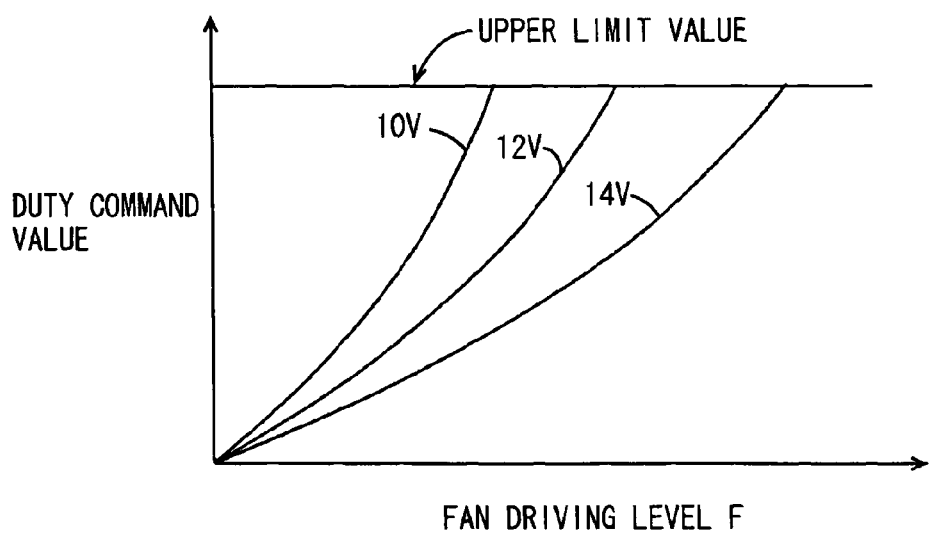
FIG. 2 shows a map used for setting a fan driving level F.
FIG. 3 shows a relationship between fan driving level F and a duty command value.

As shown in FIG. 2, a duty command value for cooling fan 402 is determined to correspond to a fan driving level F for each voltage of auxiliary battery 410. Cooling fan 402 is operated on a voltage that corresponds to each duty command value. Thus, the quantity of air of cooling fan 402 (or the number of revolutions thereof) is controlled by controlling the voltage on which cooling fan 402 operates. Note that when cooling fan 402 operates on higher voltage, i.e., for larger duty command values, cooling fan 402 rotates at higher rates (or blows air in larger quantities). Note that the FIG. 2 fan driving level F and auxiliary battery 410 are only an example.

As shown in FIG. 3, for a single fan driving level F, a larger duty command value is applied for lower voltage of auxiliary battery 410. Furthermore, as shown in FIG. 3, a difference between duty command values associated with different voltages of auxiliary battery 410 is larger as fan driving level F is higher.

Cooling fan 402 is controlled through feedback employing a voltage converted from its number of revolutions. More specifically, revolution sensor 404 detects a number of revolutions of cooling fan 402, which is in turn converted by converter 406 into voltage. A signal representing the detected voltage is transmitted to hybrid ECU 600. Hybrid ECU 600 corrects a duty command value so that a voltage corresponding to a duty command value in the FIG. 2 map (i.e., a target voltage for cooling fan 402) and the voltage transmitted from converter 406 match.

If converter 406 transmits a voltage higher than the target voltage, hybrid ECU 600 corrects the current duty command value to decrease. If converter 406 transmits a voltage lower than the target voltage, hybrid ECU 600 corrects the current duty command value to increase.

Figure 4:
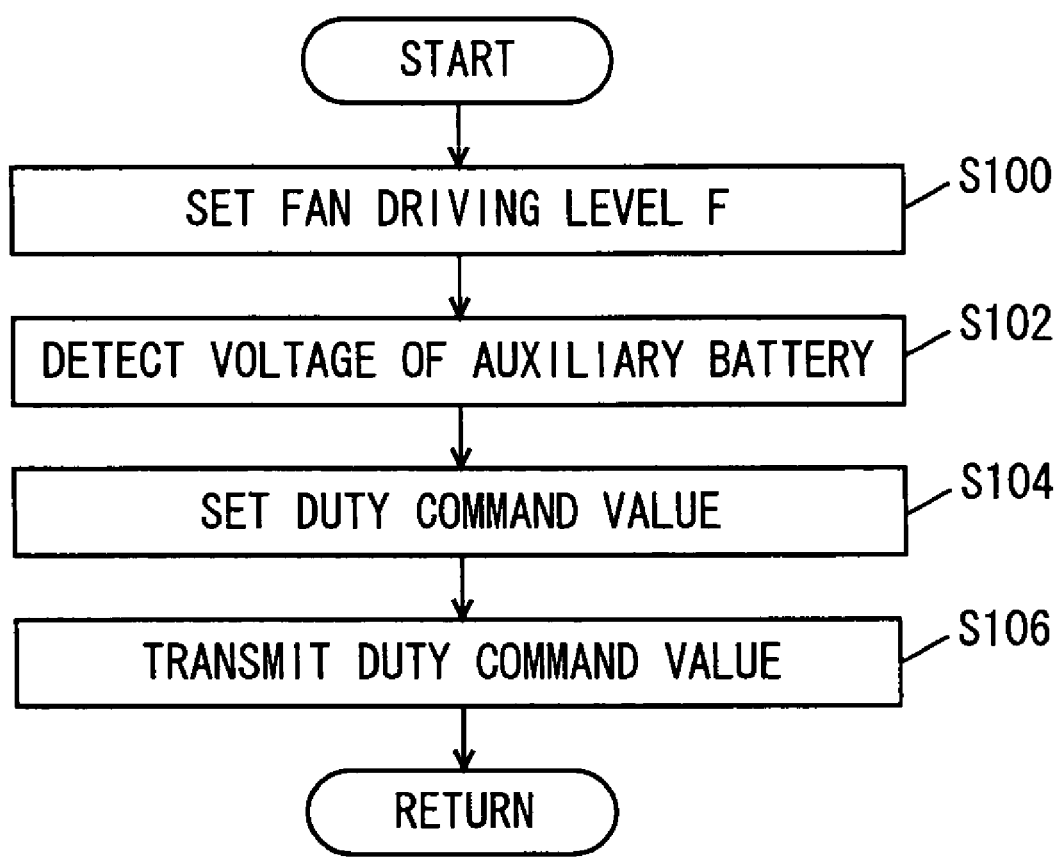
FIG. 4 is a flowchart showing a control structure of a program executed by a hybrid ECU in the first embodiment of the present invention.

With reference to FIG. 4, a control structure of a program executed by hybrid ECU 600 in the control device of the present embodiment will be described hereinafter. It should be noted that the program described below is repeated periodically as predetermined.

At step (hereafter, step is abbreviated to S) 100, hybrid ECU 600 sets fan driving level F for cooling fan 402 based on high voltage battery 400's temperature TB, SOC and input and output currents, and the cabin's internal temperature and background noise.

At S102, hybrid ECU 600 detects the voltage of auxiliary battery 410 from a signal transmitted from voltage sensor 414.

At S104, hybrid ECU 600 sets a duty command value for cooling fan 402, as based on fan driving level F and the voltage of auxiliary battery 410, with reference to the FIG. 2 map.

At S106, hybrid ECU 600 transmits the set duty command value to cooling fan 402. In other words, hybrid ECU 600 operates cooling fan 402 at the set duty command value. Note that this duty command value may be corrected by feedback control.

In accordance with the above structure and flowchart, operation of hybrid ECU 600 which is the control device of the present embodiment, will be described hereinafter.

When the vehicle is traveling, fan driving level F is set for cooling fan 402, as based on high voltage battery 400's temperature TB, SOC and input and output currents, and the cabin's internal temperature and background noise, to cool high voltage battery 400 (S1100).

Even if a single duty command value is applied to operate cooling fan 402, a number of revolution of cooling fan 402 may vary. It is because an electric power provided to cooling fan 402 varies if a voltage of auxiliary battery 410 varies. More specifically, if a single duty command value (or duty ratio) is applied to control cooling fan 402, and a voltage of auxiliary battery 410 is high, then cooling fan 402 may rotates at a higher rate and provide larger quantity of air than when a voltage of auxiliary battery 410 is low. In that case, the passenger(s) may be discomforted by the noise caused by cooling fan 402.

Accordingly in the present embodiment a duty command value is corrected in accordance with the voltage of auxiliary battery 410 and to do so the voltage (output) from auxiliary battery 410 is detected from a signal transmitted from voltage sensor 414 (S102).

From this voltage (of auxiliary battery 410) and a set fan driving level F, a duty command value is set for cooling fan 402 with reference to the FIG. 2 map (S104), and applied to operate cooling fan 402 (S106).

This can reduce variation of number of revolutions of cooling fan 402 which is caused by variation of voltage of auxiliary battery 410.

As described above, a hybrid ECU which is a control device of the present embodiment sets a duty command value in accordance with the voltage of an auxiliary battery serving as a power supply for a cooling fan. This can reduce variation of number of revolutions of the cooling fan which is caused by variation of a voltage of the auxiliary battery. Thus, a number of revolutions of the cooling fan can be thus be controlled precisely.

Second Embodiment

Hereinafter a second embodiment will be described. The present embodiment differs from the first embodiment in that a duty command value for duty command values is set in accordance with an auxiliary battery's voltage. The remainder in structure is identical to that of the first embodiment. It is also identical in function. Accordingly, it will not be described repeatedly in detail.

As shown in FIG. 5, hybrid ECU 600 sets a lower limit value for the duty command value with reference a map which has auxiliary battery 410's voltage as a parameter. According to this map, lower limit value for the duty command value is set to be lower as a voltage of auxiliary battery 410 is higher.

Figure 6:
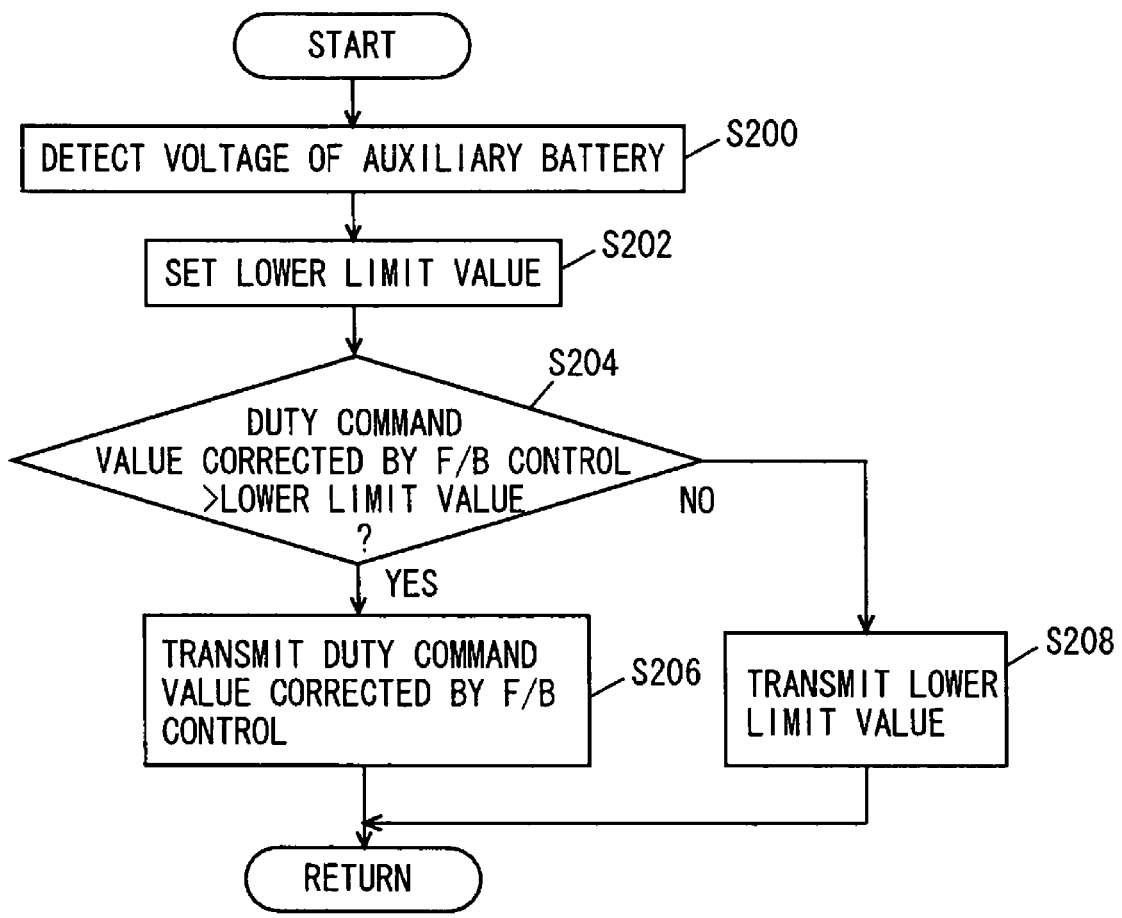
FIG. 6 is a flowchart showing a control structure of a program executed by a hybrid ECU in a second embodiment of the present invention.

With reference to FIG. 6, a control structure of a program executed by hybrid ECU 600 in the control device of the present embodiment will be described hereinafter. Note that the program described below is executed in addition to that described in the first embodiment.

At S200, hybrid ECU 600 detects the voltage of auxiliary battery 410 from a signal transmitted from voltage sensor 414.

At S202, hybrid ECU 600 sets a lower limit value for the duty command value with reference to a map shown in FIG. 5.

At S204, hybrid ECU 600 determines whether a duty command value as corrected through feedback control based on a number of revolutions of cooling fan 402 is larger than the lower limit value. If duty command value as corrected through feedback control is larger than the lower limit value (YES at S204), the process proceeds to S206. Otherwise (NO at S204), the process proceeds to S208.

At S206, hybrid ECU 600 transmits to cooling fan 402 the duty command value corrected through feedback control. In other words, hybrid ECU 600 operates cooling fan 402 at the duty command value corrected through feedback control.

At S208, hybrid ECU 600 transmits the lower limit value for the duty command value to cooling fan 402. In other words, hybrid ECU 600 operates cooling fan 402 at the lower limit value for the duty command value.

In accordance with the above structure and flowchart, operation of hybrid ECU 600 which is the control device of the present embodiment will be described hereinafter.

Figure 7:
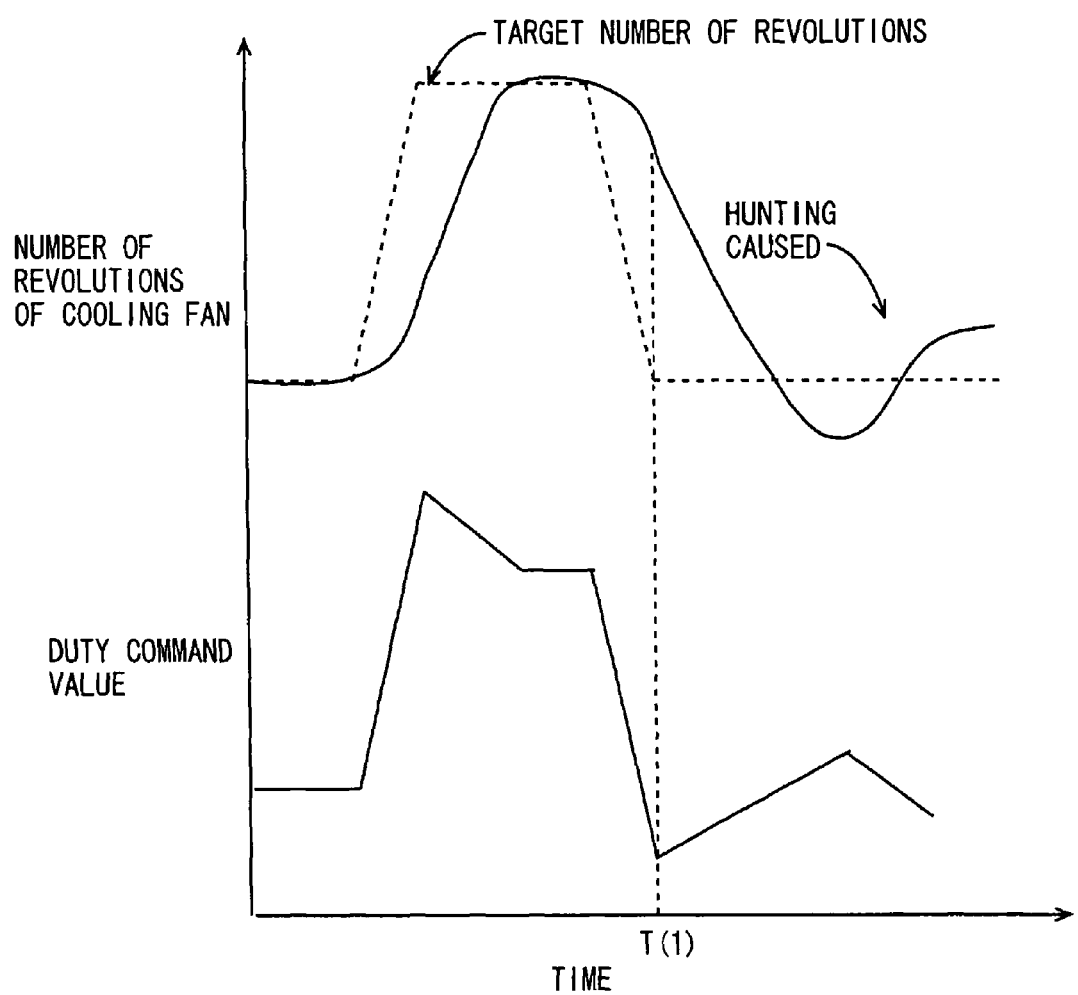
FIG. 7 is timing plots representing how the duty command value transitions.

As indicated in FIG. 7 at time T(1), if an actual number of revolutions of cooling fan 402 is larger than a number of revolutions that is expected for a duty command value set with reference to the FIG. 2 map, (i.e., a target number of revolutions), cooling fan 402 is operating on a high voltage. Accordingly the duty command value is corrected through feedback control to decrease.

In doing so, if the duty command value is significantly reduced, as shown in FIG. 7, a number of revolutions of cooling fan 402 may decrease rapidly. Accordingly, the duty command value is corrected through feedback control to increase, and cooling fan 402 may have a hunting number of revolutions. This causes cooling fan 402 to generate a noise repeatedly increasing and decreasing as it operates, and the passenger(s) feel uncomfortable.

Accordingly in the present embodiment a lower limit value is set for the duty command value, as based on the voltage of auxiliary battery 410 (S202). If a duty command value corrected through feedback control is larger than the lower limit value (YES at S204), cooling fan 402 is operated at the duty command value (corrected through feedback control) (S206).

Figure 8:
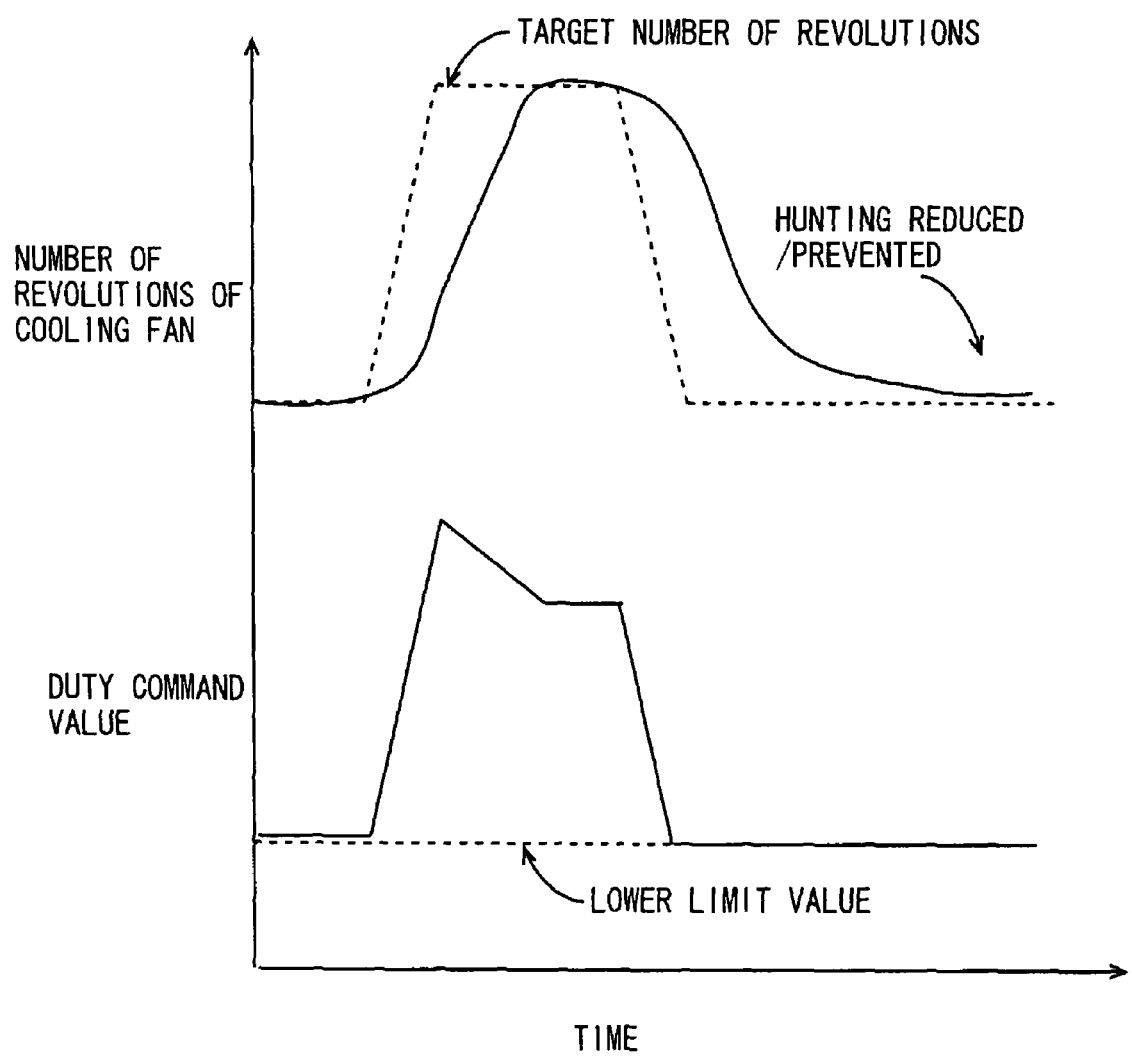
FIG. 8 is timing plots representing how the duty command value transitions.

If the duty command value corrected through feedback control is equal to or smaller than the lower limit value (NO at S204), cooling fan 402 is operated at the lower limit value for the duty command value (S208). This, as shown in FIG. 8, can prevent a number of revolutions of cooling fan 402 from reducing more than necessary and hunting.

As described above, a hybrid ECU which is a control device of the present embodiment sets a lower limit value for a duty command value, as based on an auxiliary battery's voltage. This can prevent a number of revolutions of a cooling fan from reducing more than necessary, and hunting caused by feedback control based on the number of revolutions of the cooling fan.

Note that the lower limit value set for the duty command value may be replaced with or used together with an upper limit value set therefor.

Third Embodiment

Hereinafter the present invention in a third embodiment will be described. The present embodiment differs from the first and second embodiments in whether cooling fan 402 has a malfunction is determined from a duty command value corrected through feedback control based on the number of revolutions of cooling fan 402. The remainder in structure is identical to that of the first and second embodiments. It is also identical in function. Accordingly, it will not be described repeatedly in detail.

Figure 9:
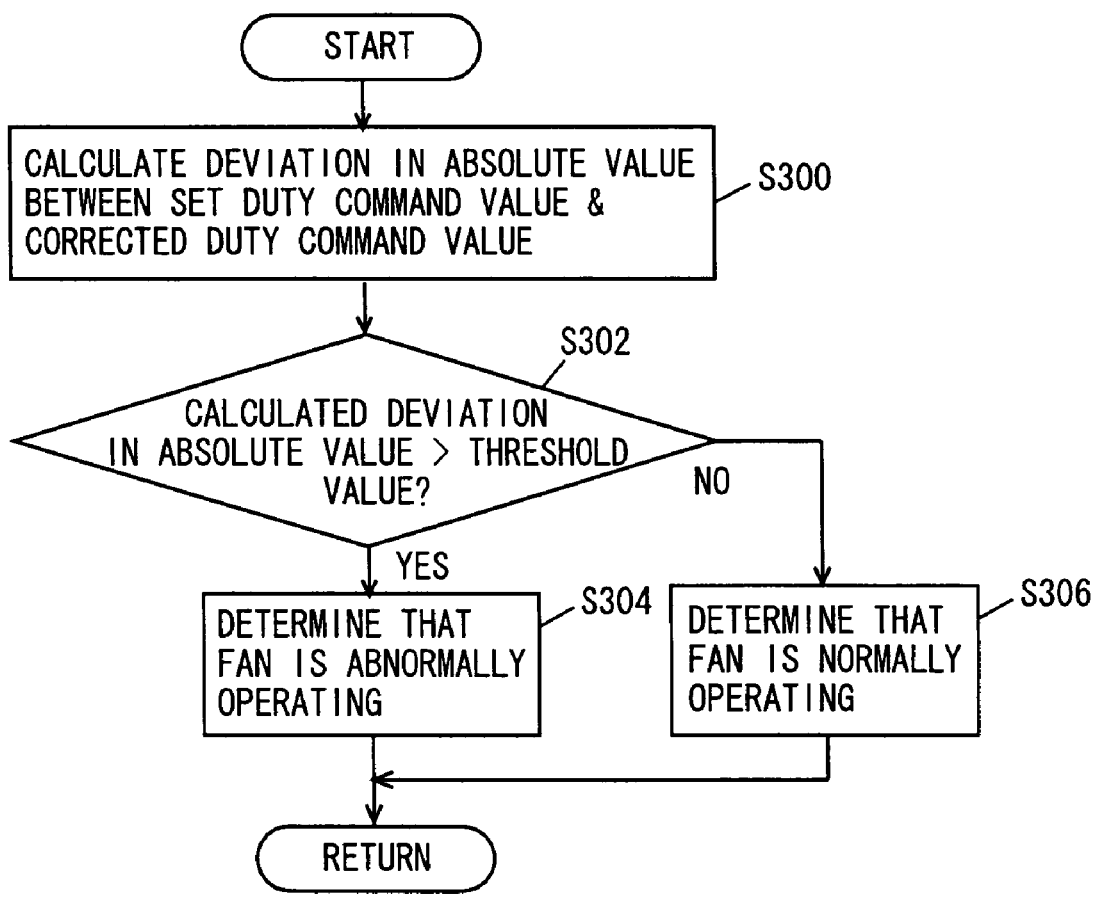
FIG. 9 is a flowchart showing a control structure of a program executed by a hybrid ECU in a third embodiment of the present invention.

With reference to FIG. 9, a control structure of a program executed by hybrid ECU 600 in the control device of the present embodiment will be described hereinafter. Note that the program described below is executed in addition to those described in the first and second embodiments.

At S300, hybrid ECU 600 calculates a deviation in absolute value between a duty command value set from fan driving level F and auxiliary battery 410's voltage with reference to the aforementioned FIG. 2 map and a duty command value as corrected through feedback control.

At S302, hybrid ECU 600 determines whether the deviation in absolute value is larger than a threshold value. If the deviation in absolute value is larger than the threshold value (YES at S302), the process proceeds to S304. Otherwise (NO at S302), the process proceeds to S306.

At S304, hybrid ECU 600 determines that cooling fan 402 has a malfunction. At S306, hybrid ECU 600 determines that cooling fan 402 is normal.

In accordance with the above structure and flowchart, a operation of hybrid ECU 600 which is the control device of the present embodiment will be described hereinafter.

While cooling fan 402 is operating, a deviation in absolute value is calculated between a duty command value set from fan driving level F and auxiliary battery 410's voltage and a duty command value corrected through feedback control (S300).

As shown in FIG. 10, if the deviation in absolute value is larger than a threshold value (YES at S302), it can be said that cooling fan 402 is not operating with a number of revolutions corresponding to the duty command value set from fan driving level F and auxiliary battery 410's voltage. That is, it can be said that cooling fan 402 is not operating as controlled.

In that case, a decision is made that cooling fan 402 has a malfunction (S306). If the deviation in absolute value is equal to or smaller than the threshold value (NO at S304), a decision is made that cooling fan 402 is normal (S306).

At the time, whether cooling fan 402 has a malfunction is determined with reference to duty command value set as based on auxiliary battery 410's voltage. Thus whether cooling fan 402 has a malfunction can be determined considering a difference in number of revolutions of cooling fan 402 that is attributed to auxiliary battery 410's voltage. Whether cooling fan 402 has a malfunction can thus be determined with precision.

As described above, hybrid ECU which is a control device of the present embodiment determines whether a cooling fan has a malfunction from a deviation in absolute value between a duty command value set from an auxiliary battery's voltage and a duty command value as corrected through feedback control. Thus, whether the cooling fan has a malfunction can be determined considering a difference in number of revolutions of the cooling fan that is attributed to the voltage of the auxiliary battery, which serves as a power supply for the cooling fan. Whether the cooling fan has a malfunction can thus be determined with precision.

Fourth Embodiment

Hereinafter the present invention in a fourth embodiment will be described. The present embodiment differs from the first to third embodiments in that (after the system is powered on) before charging auxiliary battery 410 starts, a duty command value is set to be low and correcting the duty command value through feedback control is prohibited. The remainder in structure is identical to that of the first to third embodiments. It is also identical in function. Accordingly, it will not be described repeatedly in detail.

Figure 11:
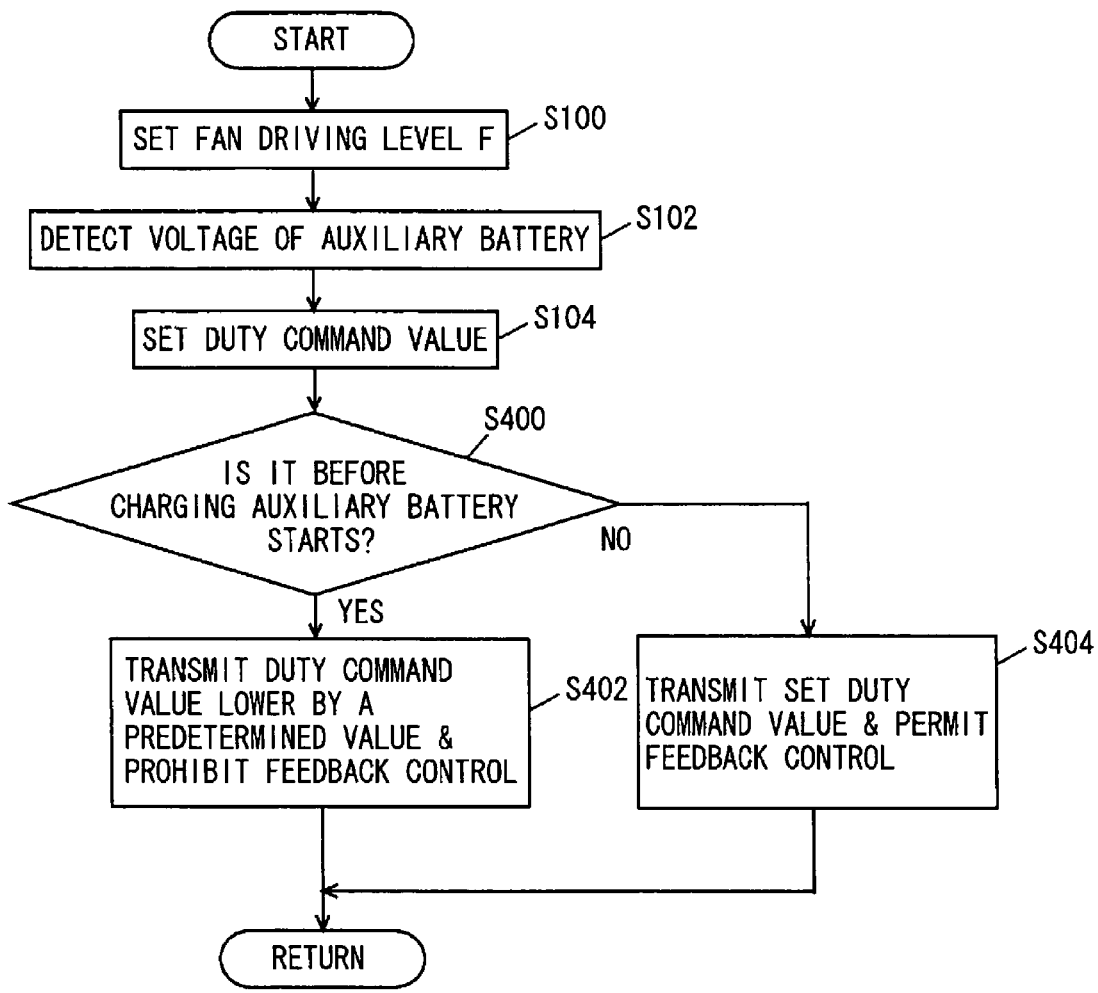
FIG. 11 is a flowchart showing a control structure of a program executed by a hybrid ECU in a fourth embodiment of the present invention.

With reference to FIG. 11, a control structure of a program executed by hybrid ECU 600 in the control device of the present embodiment will be described hereinafter. Note that the program described below is executed in place of that described in the first embodiment. The same steps as the program of the first embodiment are identically denoted. They are also identical in function. Accordingly, they will not be described repeatedly in detail.

At S400, hybrid ECU 600 determines whether it is before charging auxiliary battery 410 starts (or charging the battery is interrupted). If it is before charging auxiliary battery 410 starts (YES at S400), the process proceeds to S402. Otherwise (NO at S400), the process proceeds to S404.

At S402, hybrid ECU 600 transmits to cooling fan 402 a duty command value lower by a predetermined value than a duty command value set from fan driving level F and auxiliary battery 410's voltage with reference to the aforementioned FIG. 2 map, and also prohibits applying feedback control to that duty command value. Note that hybrid ECU 600 transmits to cooling fan 402 a duty command value corresponding to a voltage of auxiliary battery 410 that is attained after charging the battery has started.

At S404, hybrid ECU 600 transmits to cooling fan 402 the duty command value set from fan driving level F and auxiliary battery 410's voltage, and also permits applying feedback control to the duty command value.

In accordance with the above structure and flowchart, a operation of hybrid ECU 600 which is the control device of the present embodiment will be described hereinafter.

Figure 12:
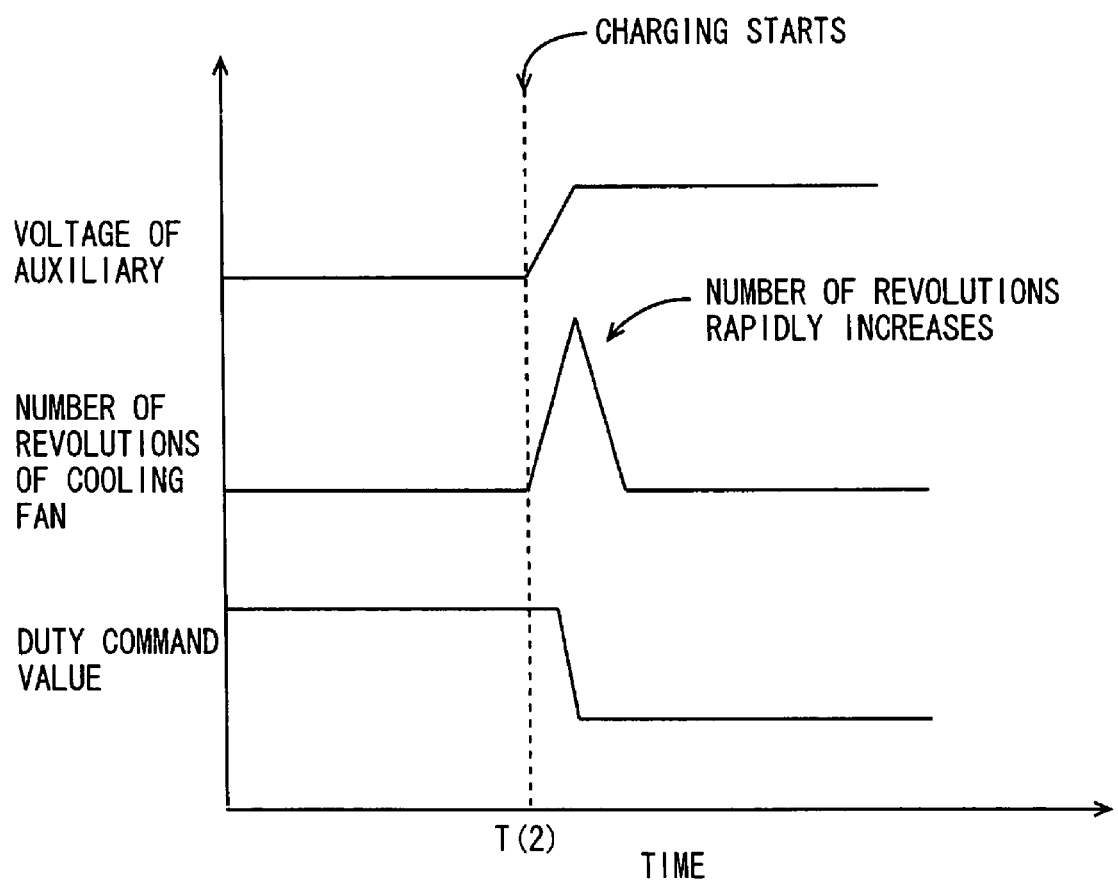
FIG. 12 is timing plots representing how a number of revolutions of the cooling fan transitions.

As indicated in FIG. 12 at time T(2), when charging auxiliary battery 410 starts, a voltage of auxiliary battery 410 rapidly increases. At the time, a number of revolutions of cooling fan 402 may rapidly increase. In the case that a number of revolutions increases rapidly, the duty command value is decreased by feedback control and a number of revolutions of cooling fan 402 decreases rapidly. If such a rapid variation in number of revolutions is repeated, a noise caused by operation of cooling fan 402 may vary rapidly and the passenger(s) may feel uncomfortable.

Accordingly in the present embodiment if it is before charging auxiliary battery 410 starts (or charging the battery is interrupted) (YES at S400), a duty command value lower by a predetermined value than a duty command value set from fan driving level F and auxiliary battery 410's voltage is transmitted to cooling fan 402 (S402), and to maintain this duty command value (the duty command value set to be low), applying feedback control to the duty command value is prohibited (S402).

Figure 13:
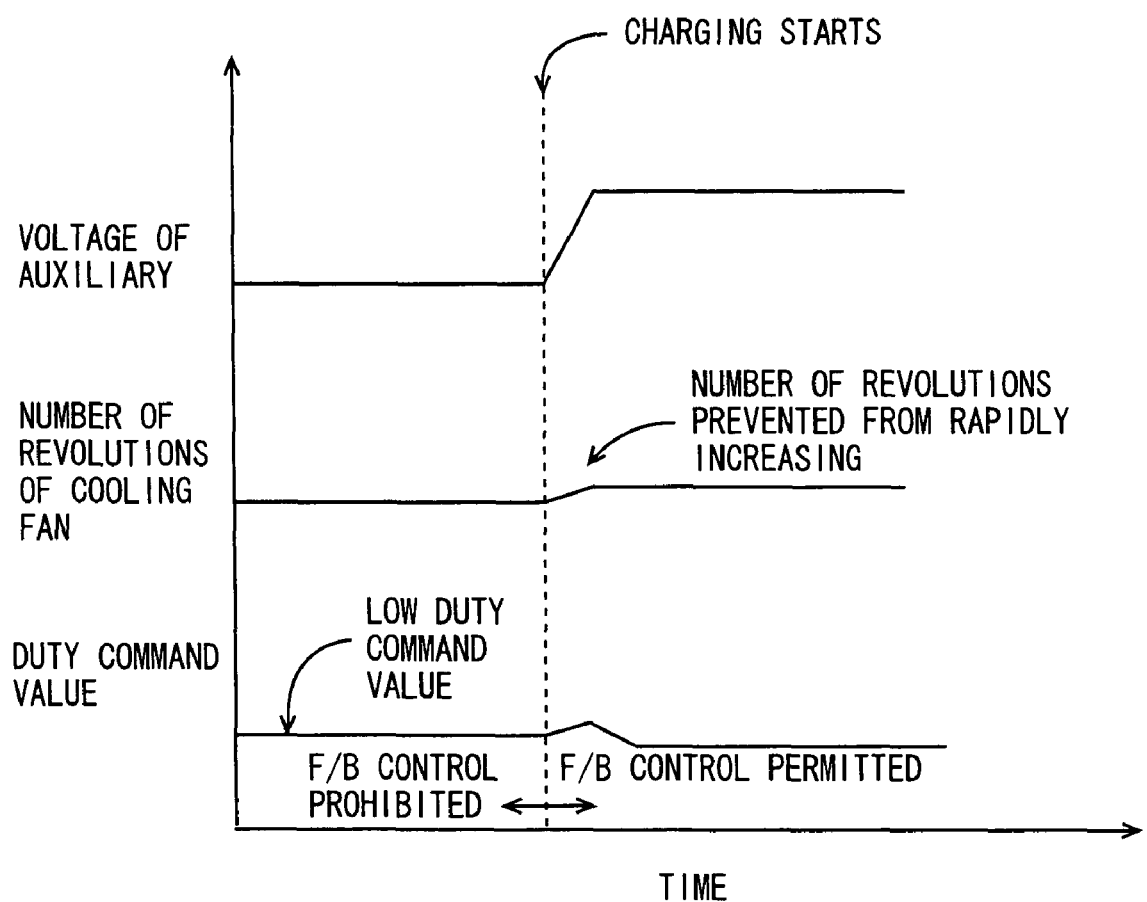
FIG. 13 is timing plots representing how a number of revolutions of the cooling fan transitions.

Thus a duty command value is set to be low previously before auxiliary battery 410 rapidly increases in voltage when charging the battery starts. Thus, as shown in FIG. 13, a number of revolutions can be prevented from rapid increasing in the case that a voltage increases rapidly when charging auxiliary battery 410 starts.

If charging auxiliary battery 410 has started (NO at S400), the duty command value set from fan driving level F and auxiliary battery 410's voltage is transmitted to cooling fan 402 and applying feedback control to the duty command value is permitted (S404).

As described above, hybrid ECU which is a control device of the present embodiment operates a cooling fan at a duty command value lower than that set as based on the auxiliary battery's voltage before charging an auxiliary battery starts, and prohibits correcting the duty command value through feedback control. Thus a duty command value is set to be low previously before voltage of the auxiliary battery rapidly increases when charging the battery starts. Thus, in the case that a voltage increases rapidly when charging the auxiliary battery starts, a number of revolutions of the cooling fan can be prevented from increasing rapidly (or such rapidly increased number of revolutions can be minimized).

Note that in the present embodiment a duty command value previously set to be low is set before charging auxiliary battery 410 starts, i.e., before a voltage of auxiliary battery 410 rapidly increases. Alternatively, a duty command value previously set to be low may be set when auxiliary battery 410 is readily to be charged (e.g., before a relay provided between high voltage battery 400 and auxiliary battery 410 turns on).

Furthermore, a duty command value previously set to be high may be set before a voltage of auxiliary battery 410 rapidly decreases.

Furthermore, rather than a duty command value (or a duty ratio), a value in resistance between auxiliary battery 410 and cooling fan 402, or the like may be varied to control the number of revolutions of cooling fan 402.

Furthermore while the first to fourth embodiments have described examples applied to a series/parallel type hybrid system with power split device 102 dividing the motive force of engine 100 to an axle and MG (1) 200 to transmit it, the present invention is also applicable to a series type hybrid vehicle that employs an engine only for driving a power generator and generates force driving an axle only by a motor that employs electric power generated by the power generator, and an electric vehicle traveling only by a motor.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A control device for a cooling fan receiving electric power from a first power storage mechanism to be driven to blow cooling air to cool a second power storage mechanism connected to said first power storage mechanism to supply said first power storage mechanism with electric power via a converter converting voltage, comprising:

a voltage sensor detecting a voltage of said first power storage mechanism; and an operation unit that is connected to said voltage sensor and sets a ratio at which a switching element provided between said first power storage mechanism and said cooling fan turns on, in accordance with the voltage of said first power storage mechanism, wherein in addition to setting said ratio in accordance with the voltage of said first power storage mechanism, said operation unit sets said ratio such that a number of revolutions of said cooling fan is larger as a difference between a temperature of said second power storage mechanism and a temperature of the cooling air blown by said cooling fan is smaller, furthermore said operation unit corrects said ratio by feedback control, as based on operational state of said cooling fan, to operate said cooling fan in a predetermined operational state;

before charging said first power storage mechanism starts, said operation unit prohibits correcting said ratio by said feedback control; and before charging said first power storage mechanism starts, said operation unit sets a ratio that is lower than said ratio set in accordance with the voltage of said first power storage mechanism.

2. The control device for the cooling fan according to claim 1, wherein a voltage of said first power storage mechanism is lower than a voltage of said second power storage mechanism.

3. The control device for the cooling fan according to claim 1, wherein in addition to setting said ratio in accordance with the voltage of said first power storage mechanism, said operation unit sets said ratio such that a number of revolutions of said cooling fan is larger as state of charge of said second power storage mechanism is larger.

4. The control device for the cooling fan according to claim 1, wherein in addition to setting said ratio in accordance with the voltage of said first power storage mechanism, said operation unit sets said ratio such that a number of revolutions of said cooling fan is larger as an input or an output current of said second power storage mechanism is larger.

5. The control device for the cooling fan according to claim 1, wherein furthermore said operation unit corrects said ratio by feedback control, as based on operational state of said cooling fan, to operate said cooling fan in a predetermined operational state, and if a difference between said ratio corrected by said feedback control and said ratio set in accordance with the voltage of said first power storage mechanism is larger than a predetermined value, said operation unit determines that said cooling fan has a malfunction.

6. The control device for the cooling fan according to claim 1, wherein said operation unit sets said ratio to increase as a voltage of said first power storage mechanism decreases.

7. A control method for a cooling fan receiving electric power from a first power storage mechanism to be driven to blow cooling air to cool a second power storage mechanism connected to said first power storage mechanism to supply said first power storage mechanism with electric power via a converter converting voltage, comprising the steps of:

detecting a voltage of said first power storage mechanism; and setting a ratio at which a switching element provided between said first power storage mechanism and said cooling fan turns on, in accordance with the voltage of said first power storage mechanism, wherein in addition to setting said ratio in accordance with the voltage of said first power storage mechanism, the step of setting said ratio includes the step of setting said ratio such that a number of revolutions of said cooling fan is larger as a difference between a temperature of said second power storage mechanism and a temperature of the cooling air blown by said cooling fan is smaller, furthermore correcting said ratio by feedback control, as based on operational state of said cooling fan, to operate said cooling fan in a predetermined operational state;

before charging said first power storage mechanism starts, prohibiting the correcting said ratio by said feedback control; and before charging said first power storage mechanism starts, setting a ratio that is lower than said ratio set in accordance with the voltage of said first power storage mechanism.

8. The control method for the cooling fan according to claim 7, wherein a voltage of said first power storage mechanism is lower than a voltage of said second power storage mechanism.

9. The control method for the cooling fan according to claim 7, wherein in addition to setting said ratio in accordance with the voltage of said first power storage mechanism, the step of setting said ratio includes the step of setting said ratio such that a number of revolutions of said cooling fan is larger as a state of charge of said second power storage mechanism is larger.

10. The control method for the cooling fan according to claim 7, wherein in addition to setting said ratio in accordance with the voltage of said first power storage mechanism, the step of setting said ratio includes the step of setting said ratio such that a number of revolutions of said cooling fan is larger as an input or an output current of said second power storage mechanism is larger.

11. The control method for the cooling fan according to claim 7, further comprising the steps of:

correcting said ratio by feedback control, as based on operational state of said cooling fan, to operate said cooling fan in a predetermined operational state; and determining that said cooling fan has a malfunction if a difference between said ratio corrected by said feedback control and said ratio set in accordance with the voltage of said first power storage mechanism is larger than a predetermined value.

12. The control method for the cooling fan according to claim 7, wherein said step of setting said ratio includes a step of setting said ratio to increase as a voltage of said first power storage mechanism decreases.

13. A control device for a cooling fan receiving electric power from a first power storage mechanism to be driven to blow cooling air to cool a second power storage mechanism connected to said first power storage mechanism to supply said first power storage mechanism with electric power via a converter converting voltage, comprising:

detection means for detecting a voltage of said first power storage mechanism; and setting means for setting a ratio at which a switching element provided between said first power storage mechanism and said cooling fan turns on, in accordance with the voltage of said first power storage mechanism, wherein in addition to setting said ratio in accordance with the voltage of said first power storage mechanism, said setting means includes means for setting said ratio such that a number of revolutions of said cooling fan is larger as a difference between a temperature of said second power storage mechanism and a temperature of the cooling air blown by said cooling fan is smaller, furthermore setting means corrects said ratio by feedback control, as based on operational state of said cooling fan, to operate said cooling fan in a predetermined operational state;

before charging said first power storage mechanism starts, setting means prohibits correcting said ratio by said feedback control; and before charging said first power storage mechanism starts, setting means sets a ratio that is lower than said ratio set in accordance with the voltage of said first power storage mechanism.

14. The control device for the cooling fan according to claim 13, wherein a voltage of said first power storage mechanism is lower than a voltage of said second power storage mechanism.

15. The control device for the cooling fan according to claim 13, wherein in addition to setting said ratio in accordance with the voltage of said first power storage mechanism, said setting means includes means for setting said ratio such that a number of revolutions of said cooling fan is larger as a state of charge of said second power storage mechanism is larger.

16. The control device for the cooling fan according to claim 13, wherein in addition to setting said ratio in accordance with the voltage of said first power storage mechanism, said setting means includes means for setting said ratio such that a number of revolutions of said cooling fan is larger as an input or an output current of said second power storage mechanism is larger.

17. The control device for the cooling fan according to claim 13, further comprising:

correction means for correcting said ratio by feedback control, as based on operational state of said cooling fan, to operate said cooling fan in a predetermined operational state; and determination means for determining that said cooling fan has a malfunction if a difference between said ratio corrected by said correction means and said ratio set by said setting means is larger than a predetermined value.

18. The control device for the cooling fan according to claim 13, wherein said setting means includes means for setting said ratio to increase as a voltage of said first power storage mechanism decreases.

* * * * *